United States Patent
Lin et al.

(10) Patent No.: US 9,755,523 B2
(45) Date of Patent: Sep. 5, 2017

(54) STEREOSCOPIC DC-DC CONVERTER AND GRID INTERCONNECTOR

(71) Applicant: Huazhong University of Science and Technology, Wuhan (CN)

(72) Inventors: Weixing Lin, Wuhan (CN); Jinyu Wen, Wuhan (CN); Shijie Cheng, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 126 days.

(21) Appl. No.: 14/412,002

(22) PCT Filed: Feb. 25, 2014

(86) PCT No.: PCT/CN2014/072498
§ 371 (c)(1),
(2) Date: Dec. 30, 2014

(87) PCT Pub. No.: WO2015/014123
PCT Pub. Date: Feb. 5, 2015

(65) Prior Publication Data
US 2016/0285373 A1   Sep. 29, 2016

(30) Foreign Application Priority Data

Jan. 20, 2014  (CN) .......................... 2014 1 0024869

(51) Int. Cl.
*H02M 3/335* (2006.01)
*H02M 7/797* (2006.01)
(Continued)

(52) U.S. Cl.
CPC ......... *H02M 3/33507* (2013.01); *H02J 1/102* (2013.01); *H02J 3/36* (2013.01);
(Continued)

(58) Field of Classification Search
CPC ... H02M 2001/0074; H02M 2001/009; H02M 2001/0093; H02M 1/32; H02M 3/33507;
(Continued)

(56) References Cited

U.S. PATENT DOCUMENTS 4,847,745 A * 7/1989 Shekhawat ......... H02M 7/5387
363/132
5,532,575 A * 7/1996 Ainsworth ............ H02J 3/1857
323/211
(Continued)

FOREIGN PATENT DOCUMENTS

CN   101297453 A   10/2008
CN   103117666 A   5/2013
(Continued)

OTHER PUBLICATIONS

Wang, Peibo et al., "Research on the control of voltage stability in renewable energy system based on bidirectional high power DC/AC/DC converter," *Journal of North China Electric Power University*, Sep. 30, 2009, 36(5): 22-26.
(Continued)

*Primary Examiner* — Fred E Finch, III
(74) *Attorney, Agent, or Firm* — Davis Wright Tremaine LLP

(57) ABSTRACT

The present invention discloses a stereoscopic DC-DC converter for power transfer between two DC grids, the converter comprises a first converter, a second converter and a third converter, a positive terminal of the first converter is connected to a positive terminal of a second DC grid, a negative terminal of the first converter is connected to a positive terminal of the second converter, a negative terminal of the second converter is connected to a positive terminal of the third converter, a negative terminal of the third converter is connected to a negative terminal of the second DC grid, in the meantime, a positive terminal of the
(Continued)

second converter is also connected to a positive terminal of a first DC grid, and the negative terminal of the second converter is also connected to a negative terminal of the first DC grid. Compared with the conventional DC-DC converter employing the DC-AC-DC converting technology, the DC-DC converter of the invention makes full use of existing DC voltage of the first DC grid, which significantly reduces overall power of converters that are used, and thus cost and power loss caused thereby.

18 Claims, 9 Drawing Sheets

(51) Int. Cl.
    *H02M 7/757*     (2006.01)
    *H02J 3/36*     (2006.01)
    *H02J 1/10*     (2006.01)
    H02M 7/49     (2007.01)
    H02M 1/00     (2006.01)
    H02M 7/483     (2007.01)
    H02M 1/32     (2007.01)

(52) U.S. Cl.
    CPC ......... *H02M 7/7575* (2013.01); *H02M 7/797* (2013.01); *H02M 1/32* (2013.01); *H02M 3/335* (2013.01); *H02M 7/49* (2013.01); *H02M 2001/0074* (2013.01); *H02M 2001/0077* (2013.01); *H02M 2007/4835* (2013.01); *Y02E 60/60* (2013.01)

(58) Field of Classification Search
    CPC ......... H02M 3/33569; H02M 3/33592; H02M 7/4807; H02M 7/49; H02M 7/7575; H02M 2007/4835; H02M 7/797
    See application file for complete search history.

(56) References Cited

U.S. PATENT DOCUMENTS

| | | | |
|---|---|---|---|
| 6,278,626 B1* | 8/2001 | Teichmann | H02M 7/4826 363/135 |
| 2009/0196764 A1* | 8/2009 | Fogarty | F04D 25/0606 417/44.1 |
| 2013/0201727 A1* | 8/2013 | Kolar | H02J 3/01 363/17 |
| 2014/0375122 A1* | 12/2014 | Papastergiou | H02J 1/102 307/18 |
| 2015/0145252 A1* | 5/2015 | Lin | F03D 9/005 290/44 |
| 2015/0280594 A1* | 10/2015 | Lin | H02M 3/33546 363/21.04 |
| 2016/0006243 A1* | 1/2016 | Jovcic | H02J 1/10 363/35 |

FOREIGN PATENT DOCUMENTS

| | | | | |
|---|---|---|---|---|
| CN | 103208929 A | 7/2013 | | |
| CN | 103337972 A | 10/2013 | | |
| EP | 2458725 A1 | 5/2012 | | |
| JP | 2012044801 A | 3/2012 | | |
| SE | WO 2013071962 A1 * | 5/2013 | | H02J 1/102 |

OTHER PUBLICATIONS

PCT Written Opinion in corresponding International application No. PCT/CN2014/072498, mailed Oct. 24, 2014.

* cited by examiner

STEREOSCOPIC DC-DC CONVERTER AND GRID INTERCONNECTOR

CROSS-REFERENCE TO RELATED APPLICATIONS

The present application is a U.S. National Stage entry under 35 U.S.C. §371 of International Application No. PCT/CN2014/072498, filed on Feb. 25, 2014, designating the United States of America, which in turn claims priority to Chinese Application No. 201410024869X, filed on Jan. 20, 2014, each of which is hereby incorporated by reference in its entirety.

FIELD OF THE INVENTION

The invention relates to flexible power transmission and distribution area for power systems, and more particularly, to a DC-DC converter for power transfer between DC grids in different regions.

BACKGROUND OF THE INVENTION

With the development of modular multilevel converters, using the modular multilevel converter to construct DC grid has become a hot topic which attracts great concern in the power industry. Interconnection of DC power grids in different regions is an urgent problem that needs to be solved. Due to difference in functions of DC grids in different regions, that in technologies that are adopted, and that in constructing time, rated DC voltages of DC grids in different regions may be different. To interconnect DC grids with different rated DC voltages, DC-DC converters need to be used. In the power distribution level, a micro DC grid has become a hot topic, and interconnection of micro grids with different rated DC voltages requires DC-DC converters.

In the power transmission level, a traditional DC-DC converter usually employs a DC-AC-DC converting topology with two-stage AC/DC conversion (as discussed by Wang peibo, et al, Research on control of voltage stability in renewable energy system based on bi-directional high power DC/AC/DC converter, Journal of North China Electric Power University, vol. 36, no. 5, pp. 22-26, September 2009). A detailed scheme thereof can be summarized as: constructing two converters, DC terminals of the two converters are respectively connected to a first DC grid and a second DC grid (a rated DC voltage of the first DC grid is denoted herein to be lower than that of the second DC grid), AC terminals of the two converters are interconnected with each other via an AC circuit. A first converter conducts DC/AC conversion to convert DC power of the first DC grid to AC power, then a second converter conducts AC/DC conversion to rectify the AC power inverted by the first converter into DC power, which is then fed into the second DC grid.

A remarkable feature of the above-mentioned DC-DC converter is that there is no direct electrical connection between the DC terminals of the two converters, therefore, there is no direct electrical connection between the two DC grids, and the two DC grids are interconnected via the AC circuit. As such, firstly, since the rated DC voltage of the first converter and that of the second converter of the DC-DC converter are respectively equal to the rated DC voltage of the first DC grid and that of the second DC grid, it is impossible for the second converter to make full use of existing DC voltage of the first DC grid, and a high rated DC voltage of the second converter leads to increase in cost. Secondly, rated power of the first converter and the second converter of the above-mentioned DC-DC converter is respectively equal to transferred power between the first DC grid and the second DC grid, and overall power of the converter is 2 times the transferred power between the first DC grid and the second DC grid, which increases cost of the converter; thirdly, the transferred power of the convertor requires a two-stage full AC/DC (or DC/AC) conversion, which features great power loss; In addition, overall power rating of the AC circuit is two times the transferred power, capital investment in interconnection of AC transformers and that in phase reactors are high.

SUMMARY OF THE INVENTION

It is an objective of the invention to provide a stereoscopic DC-DC converter capable of making full use of existing DC voltage of a first DC grid and directly and electrically connecting the first DC grid to a second DC grid so that part of transferred power between the first DC grid and the second DC grid is transferred via the direct and electrical connection between the first DC grid and the second DC grid without DC-AC-DC conversion, to address problems with the above-mentioned DC-DC converter, and to reduce overall power rating of the DC-DC converter so as to reduce cost and power loss.

To achieve the above objectives, the invention is implemented as follows:

Provided is a stereoscopic DC-DC converter for power transfer between two DC grids, comprising a first converter, a second converter and a third converter, a positive terminal of the first converter is connected to a positive terminal of the second DC grid; a negative terminal of the first converter is connected to a positive terminal of the second converter; a negative terminal of the second converter is connected to a positive terminal of the third converter; a negative terminal of the third converter is connected to a negative terminal of the second DC grid; in the meantime, a positive terminal of the second converter is also connected to a positive terminal of the first DC grid; and the negative terminal of the second converter is also connected to a negative terminal of the first DC grid.

In a class of the embodiment, AC terminals of the first converter, the second converter and the third converter are connected together via transformers or phase reactors at an AC side, a common point of connection operating as an common AC bus.

In a class of the embodiment, AC terminals of transformers of the first converter and the third converter in the vicinity of a DC side employs delta connection to eliminate unbalanced neutral points of the first converter and the third converter, AC terminals of transformers of the second converter in the vicinity of a DC side and terminals of the first converter and third converter in the vicinity of an AC side employ star connection or delta connection.

In a class of the embodiment, the first converter and the third converter operate to control active power thereof, and the second converter operates to control AC voltage of the AC grid connected thereto whereby facilitating stable operation of the stereoscopic DC-DC converter.

In a class of the embodiment, the first converter and the third converter operate to control AC voltage of the AC grid connected thereto, and the second converter operates to control the transferred power between the first DC grid and the second DC grid whereby facilitating stable operation of the stereoscopic DC-DC converter.

In a class of the embodiment, the first converter and the third converter are connected to the common AC bus via phase reactors, and each phase of the phase reactor employs delta connection to eliminate unbalanced neutral points of the first converter and the third converter.

In a class of the embodiment, the first DC grid and the second DC grid is formed by interconnecting one or more AC systems at the DC side after AC/DC conversion.

In a class of the embodiment, the first DC grid and/or the second DC grid is formed by interconnecting one or more AC grids to a DC system outputting DC power at the DC side after AC/DC conversion.

In a class of the embodiment, the common AC bus in connected to an external AC grid.

In a class of the embodiment, the first converter, the second converter and the third converter are respectively connected to different AC grids.

In a class of the embodiment, if the common AC bus is not connected to an external AC grid, rated DC voltages of the first convertor and the third converter are respectively designed to be half difference in the rated DC voltages of the second DC grid and the first DC grid, a rated DC voltage of the second converter is the same as that of the first DC grid, rated power of the first converter and the third converter is respectively $0.5*P*(1-E1/E2)$, rated power of the second converter is $P*(1-E1/E2)$, where P is rated transferred power between the first DC grid and the second DC grid, E1 is the rated DC voltage of the first DC grid (a rated voltage between a positive pole and a negative pole thereof), E2 is the rated DC voltage of the second DC grid (a rated DC voltage between a positive pole and a negative pole thereof), the above rated DC voltages and rated power are reference values, and can be properly increased or decreased based on the reference values whereby ensuring normal operation of the DC-DC convertor in real use.

In a class of the embodiment, if the common AC bus is connected to the external AC grid, or if the first converter, the second converter and the third converter are respectively connected to different AC grids, the rated DC voltage of the second converter is the same as that of the first DC grid, the rated DC voltages of the first converter and the third converter are respectively designed to be half the difference in the rated DC voltages of the second DC grid and the first DC grid, the rated power of the first converter, the second converter and the third converter can be freely designed as required, the above rated DC voltages are reference values, and can be properly increased or decreased based on the reference values whereby ensuring normal operation of the DC-DC convertor in real use.

In a class of the embodiment, the first DC grid and the second DC grid can employ symmetrical bipolar, symmetrical monopole, unsymmetrical monopole and unsymmetrical bipolar topologies.

In a class of the embodiment, the first converter and the third converter employ line commutated converter, and the second converter employs a voltage source converter, and power can be transferred unidirectionally to the second DC grid from the first DC grid or to the first DC grid from the second DC grid under this topology.

Further provided is a DC-DC converter with an optimized position of a DC circuit breaker, a first DC circuit breaker is serially connected between a negative terminal of a first converter and a positive terminal of a second converter, a second DC circuit breaker is serially connected between a negative terminal of the second converter and a positive terminal of a third converter. With the DC circuit breakers installed in the above positions, a first DC grid is not to provide fault current to a second DC grid when DC fault occurs on the second DC grid, the first DC circuit breaker and the second DC circuit breaker are to be serially connected with the first converter and the third converter to endure DC voltage of the second DC grid so that the first converter and the third converter are not to be destroyed by over voltage as DC fault occurs on the first DC grid.

In a class of the embodiment, rated DC voltages of the first DC circuit breaker and the second DC circuit breaker are half that of the second converter, rated currents of the first DC circuit breaker and the second DC circuit breaker are designed to be $P/E1$-$P/E2$, the above designed values are reference values, the designed values can be properly increased or decreased based on the reference values in real use.

Further provided is a method for protecting the stereoscopic DC-DC converter as DC fault occurs on the second grid, comprising: blocking trigger pulses of the fully controllable power electronics devices or the thyristors in the first converter to cut off paths of DC fault current provided to fault points of the second DC grid by the first converter, the second converter and the third converter via the fully controllable power electronics devices or the thyristors respectively, and simultaneously opening the first DC circuit breaker and the second DC circuit breaker to cut off paths of DC fault current provided to the fault points of the second DC grid by the first DC grid via diodes of the first converter and the third converter upon detecting DC fault on the second DC grid.

Still further provided is a method for protecting the stereoscopic DC-DC converter as DC fault occurs on the first grid, comprising: blocking trigger pulses of fully controllable power electronics devices or thyristors in the first converter, the second converter and the third converter to cut off paths of DC fault current provided to fault points of the first DC grid by the first converter, the second converter and the third converter via the fully controllable power electronics devices or the thyristors respectively, and simultaneously opening the first DC circuit breaker and the second DC circuit breaker so that voltage of the second DC grid is applied to a series connection circuit of the first converter, the first DC circuit breaker, the second DC circuit breaker and the third converter so as to protect the first converter and the third converter from being destroyed by over voltage as the first converter and the third converter solely endure DC voltage of the second DC grid upon detecting DC fault on the first DC grid.

In summary, the present invention has the following advantages over the prior art:

(1) there is no need to construct a second converter as in the conventional DC-DC converter that has the same rated DC voltage as the second DC grid, and functions of the second converter are facilitated by serial connection of the first converter, the first DC grid and the third converter. Since the first DC grid is inserted in the circuit, the present invention makes full use the DC voltage already existing in the first DC grid, which reduces the rated DC voltages of the first converter and the third converter, and thus cost.

(2) overall power of all the three converters is $2P*(1-E1/E2)$, while that of all converter in the conventional DC-DC converter is $2P$, which is 2 times the transferred power between different grids, the overall power of converters in the present invention is lower than that of the conventional DC-DC converter, which significantly reduces cost of the converter.

(3) In the converter of the present invention, only $P*(1-E1/E2)$ power needs two-stage AC/DC conversion (or DC/AC conversion), and the remaining P*E1/E2 transferred power will be transferred via direct electrical interconnection between the first DC grid and the second DC grid, while in the conventional DC-DC converter, all of the transferred power P needs two-stage AC/DC (or DC/AC) conversion, therefore, power loss of the converter of the invention is much lower than that of the conventional DC-DC converter, which significantly reduces operation cost.

(4) overall power of the AC circuit in the present invention is 2P*(1-E1/E2), while that of an AC circuit in the conventional DC-DC converter is 2P, and therefore, the present invention is able to significantly reduce cost of the AC circuit.

BRIEF DESCRIPTION OF ACCOMPANYING DRAWINGS

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

A stereoscopic DC-DC converter of an exemplary embodiment of the invention operates to interconnect two DC grids with different rated DC voltages, and is able to solve problems with a conventional DC-DC converter employing DC-AC-DC conversion that cost of the converter is high and power loss thereof is great.

Figure 1:
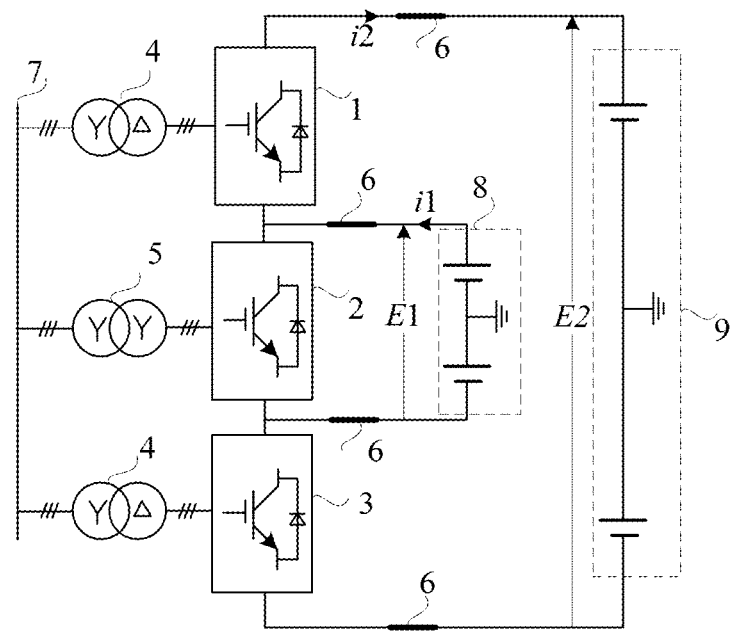
FIG. 1 is a schematic diagram of a stereoscopic DC-DC converter of an exemplary embodiment of the invention.

As shown in FIG. 1, the stereoscopic DC-DC converter comprises a first converter 1, a second converter 2 and a third converter 3, a positive terminal of the first converter 1 is connected to a positive terminal of a second DC grid 9 via a DC transmission line 6, a negative terminal of the first converter 1 is connected to a positive terminal of the second converter 2, a negative terminal of the second converter 2 is connected to a positive terminal of the third converter 3, a negative terminal of the third converter 3 is connected to a negative terminal of the second DC grid 9 via the DC transmission line 6, the positive terminal and the negative terminal of the second converter 2 are also connected to a positive terminal and a negative terminal of a first DC grid 8 via the DC transmission line 6, an AC terminal of the first converter 1 is connected to a common AC bus 7 via a transformer 4, an AC terminal of the second converter 2 is connected to the common AC bus 7 via another transformer 5, and an AC terminal of the third converter 3 is connected to the common AC bus 7 via the transformer 4. In this embodiment, the converter may employ a well-known voltage source converter for bi-directional power flow.

As shown in the embodiment of FIG. 1, the first DC grid 8 and the second DC grid 9 employ symmetrical bipolar DC systems, therefore the transformer 4 employs star/delta connection to eliminate unbalanced neutral points of the first converter 1 and the third converter 3, the transformer 5 may employ either star/star connection or star/delta connection. To enable the embodiment of FIG. 1 to operate properly, a preferred control mode is that the second converter 2 operates to control AC voltage of the common AC bus 7, and the first converter 1 and the third converter 3 operate to control respective active power transferred thereby.

Design of rated DC voltages and rated power of the first converter 1, the second converter 2 and the third converter 3 will be analyzed hereinafter. The rated DC voltages of the first DC grid 8 and the second DC grid 9 are respectively represented as E1 and E2, the rated DC voltage refer to a rated voltage between a positive pole and a negative pole, measuring points of E1 and E2 are shown in FIG. 1, output DC current of the first DC grid 8 is represented as i1, input DC current of the second DC grid 9 is represented as i2, transferred power between the first DC grid 8 and the second DC grid 9 is represented as P. It is well-known in the art that i1=P/E1, i2=P/E2, furthermore, the rated power of the second converter 2 is E1*(i1-i2)=(1-E1/E2)*P, the rated power of the first converter 1 and the third converter 3 is (E2−E1)/2*i2=0.5*P*(1−E1/E2). Overall power of the three converters is 2*(1−E1/E2)*P. By calculating the rated power of the first converter 1, the second converter 2 and the third converter 3, it can be seen that the overall power of the three converters is always lower than 2*P, the closer E1 and E2 are, the smaller the overall power of the three converters will be. Assuming the rated DC voltage of the first DC grid 8 is ±320 kV, namely, E1=640 kV, the rated DC voltage of the second DC grid 9 is ±640 kV, namely, E2=1280 kV, the overall power of the three converters is P, which equals the rated transferred power between the first DC grid 8 and the second DC grid 9, while overall power rating of the converters required by a conventional DC-DC converter employing the DC-AC-DC conversion is always 2*P, and cost thereof is much higher than that of the stereoscopic DC-DC converter of the invention.

Figure 2:
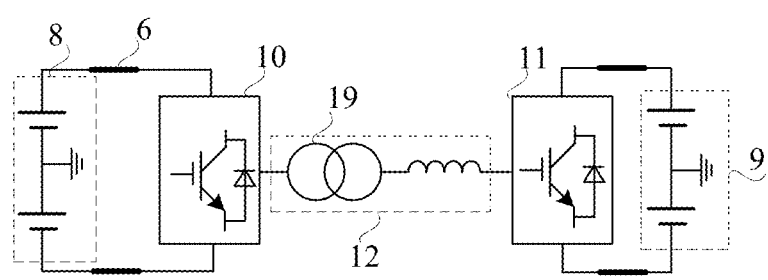
FIG. 2 is a topology diagram of a DC-DC converter in the prior art.

FIG. 2 illustrates topology of the conventional DC-DC converter so as to compare the present invention with the prior art. The conventional DC-DC converter is formed by interconnecting a converter 10 and a converter 11 via an internal AC circuit 12. The following difference can be obtained after comparing FIG. 1 with FIG. 2:

1) There is direct electrical interconnection between the first DC grid 8 and the second DC grid 9 of the stereoscopic DC-DC converter, namely, the positive and the negative terminal of the first DC grid 8 are respectively connected to the positive terminal and the negative terminal of the second DC grid 9 via the first converter 1 and the third converter 3; while for the conventional DC-DC converter, there is no direct electrical connection between the first DC grid 8 and the second DC grid 9, DC power from the first DC grid 8 is firstly converted into AC power by the converter 10, transferred to an AC side of the converter 11 via the internal AC circuit 12, then converted into DC by the converter 11, and finally connected to the second DC grid 9, the internal AC circuit 12 employs an AC transformer 19 connected to an AC circuit between the converter 10 and the converter 11. Connection facilitated by an AC transformer 16 is known as magnetic coupling instead of direct electrical connection.

2) since the stereoscopic DC-DC converter of the invention employs improved topology as mentioned above, in the stereoscopic DC-DC converter, the first DC grid 8 is able to transmit power to the second DC grid 9 via the AC circuit formed by the transformers 4 and 5 and the common AC bus 7, as well as the direct electrical connection formed by the first converter 1 and the third converter 3, therefore, the overall power rating of the converters of the stereoscopic DC-DC converter is half the transferred power between the first DC grid and the second DC grid, while the overall power required by the conventional DC-DC converter is always 2 times the rated transferred power.

Figure 3:
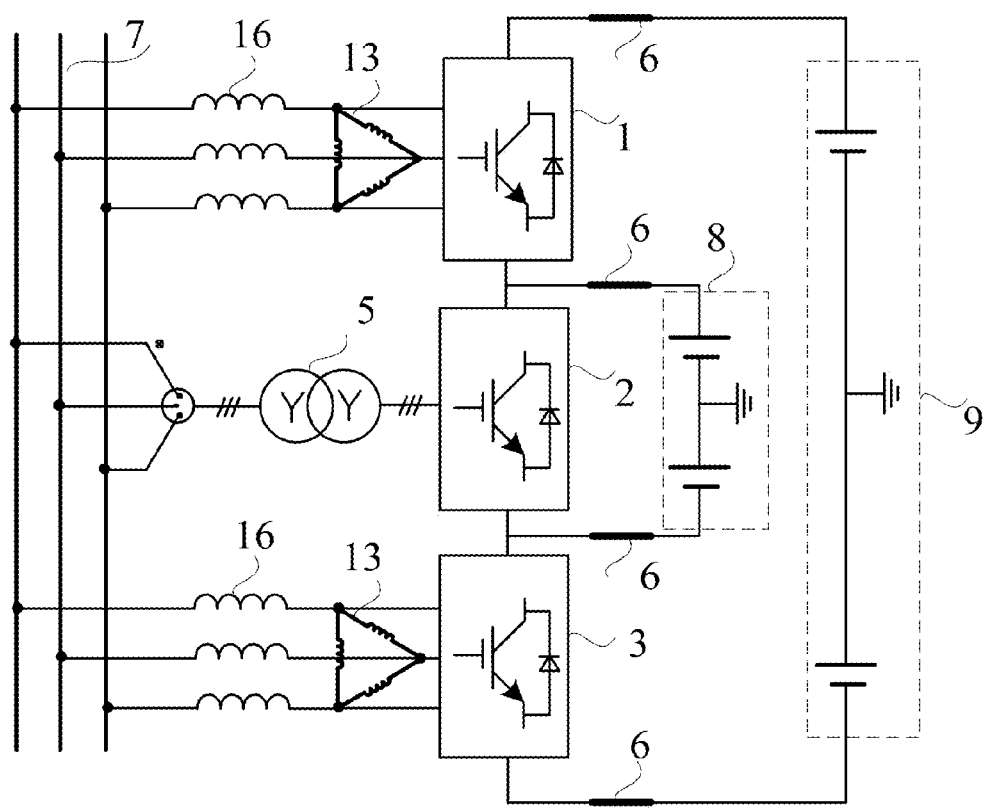
FIG. 3 is a topology diagram illustrating a first converter and a third converter connected to an common AC bus via phase reactors in delta connection of another exemplary embodiment of the invention.

FIG. 3 illustrates another embodiment of the present invention, which is similar to FIG. 1, except that the first converter 1 and the third converter 3 are not connected to the common AC bus 7 via the transformers, but to the common AC bus 7 via a delta-connection phased reactor 13 and a conventional phase reactor 16, therefore, the embodiment of FIG. 3 requires an AC voltage of the common AC bus 7 be equal to the output AC voltage of each of the first converter 1 and the third converter 3, but a magnitude of the output AC voltage of the second converter 2 is not necessarily equal to that of the output AC voltage of each of the first converter 1 and the third converter 3. As such, in the embodiment shown in FIG. 3, the second converter 2 is connected to the common AC bus 7 via the transformer 5 so that the magnitude of the output AC voltage of the second converter 2 is equal to that of each of the first converter 1 and third converter 3 after stepping up/stepping down by the transformer 5.

Figure 4:
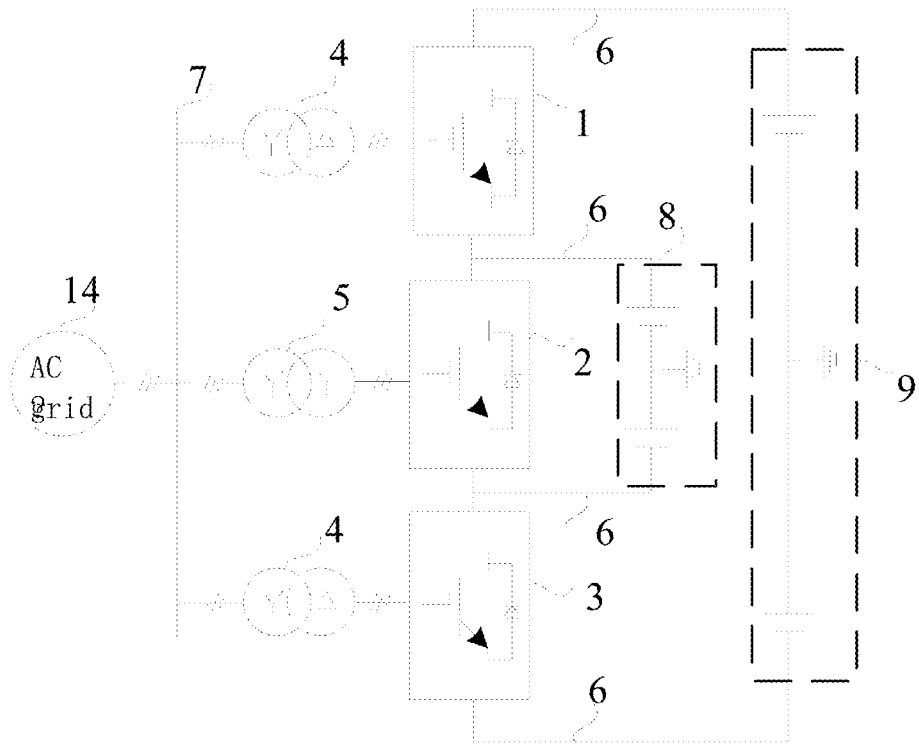
FIG. 4 is a diagram illustrating an common AC bus connected to an AC grid of a still another exemplary embodiment of the invention.

FIG. 4 illustrates a still another embodiment of the present invention, which is similar to FIG. 1, except that the common AC bus 7 is also connected to an AC grid 14.

Figure 5:
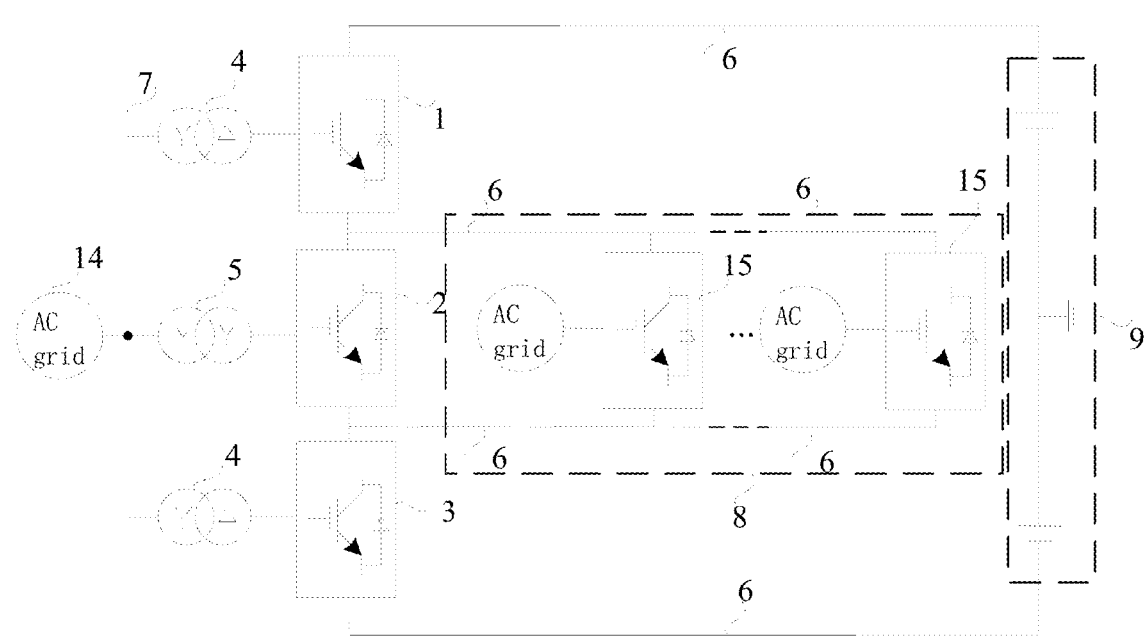
FIG. 5 illustrates a first DC grid formed by AC/DC conversion of multiple AC grids and interconnection thereof at a DC side of a further exemplary embodiment of the invention.

FIG. 5 illustrates a further embodiment of the present invention, which is similar to FIG. 4, except that FIG. 5 provides implementation of the first DC grid, namely interconnecting multiple AC grids 14 at the DC side after performing AC/DC conversion thereon via a converter 15.

Figure 6:
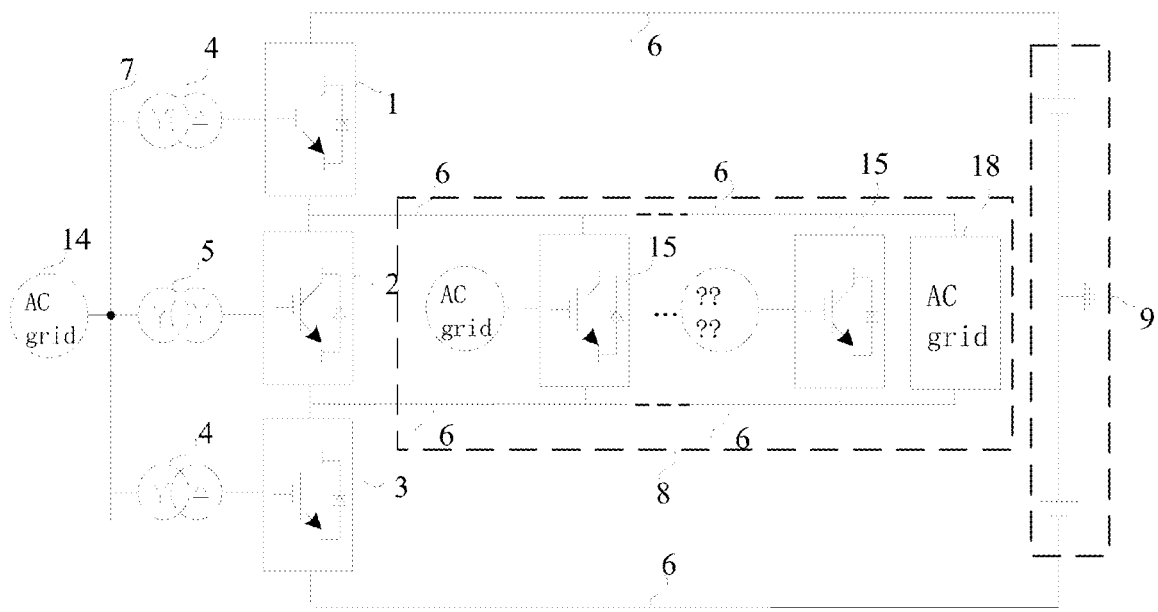
FIG. 6 illustrates a DC grid formed by AC/DC conversion of multiple AC grids and parallel connection of a DC grid therewith of a fifth exemplary embodiment of the invention.

FIG. 6 illustrates a fifth embodiment of the present invention, in which the first DC grid 8 is constructed by connecting multiple AC grids 14 to a DC grid 18 at the DC side after performing AC/DC conversion thereon via the converter 15, and the second DC grid 9 is constructed in a similar way.

Figure 7:
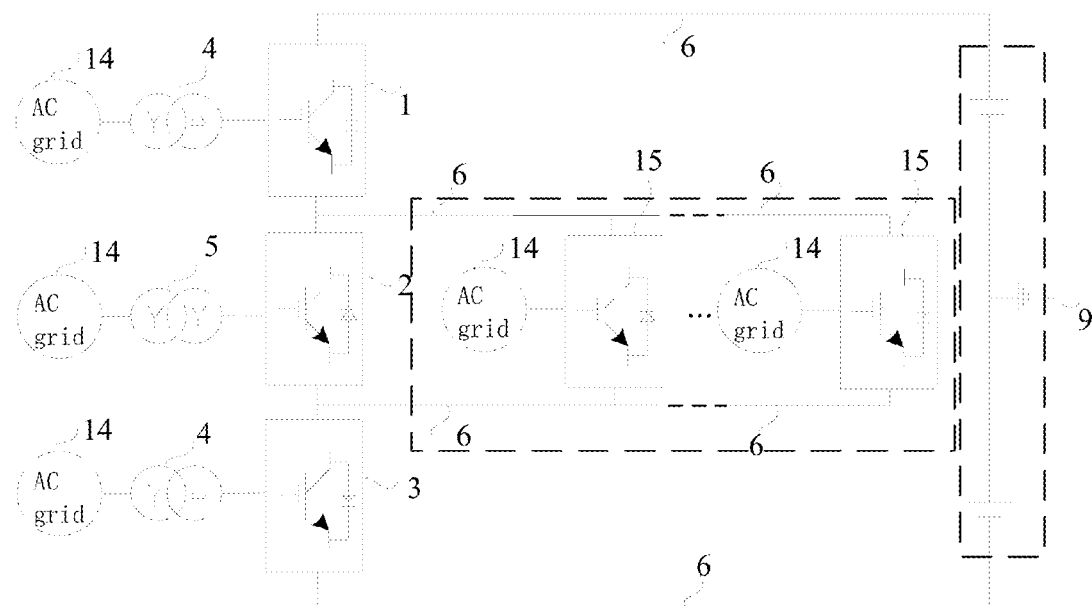
FIG. 7 illustrates the first converter, the second converter and the third converter connected to different AC grids of a sixth exemplary embodiment of the invention.

FIG. 7 illustrates a sixth embodiment of the present invention, in which AC sides of the first converter 1, the second converter 2 and the third converter 3 are respectively connected to different AC grids 14.

Figure 8:
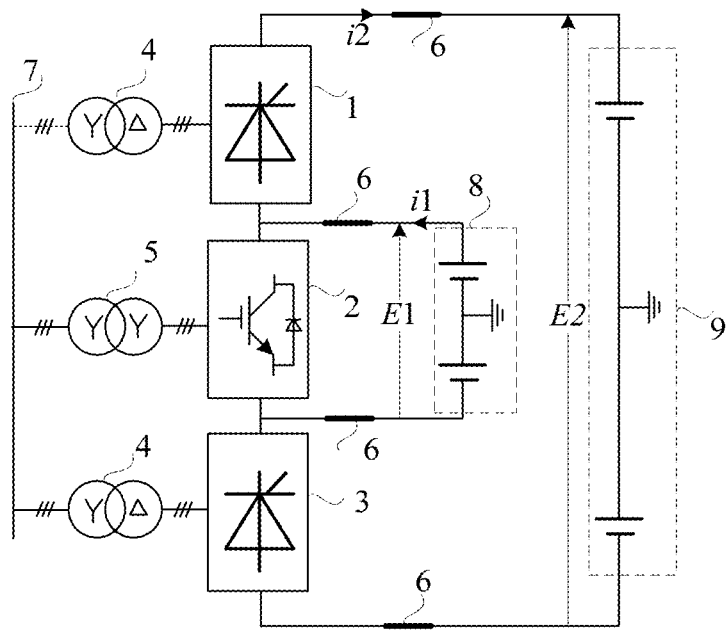
FIG. 8 illustrates a scenario where the first converter and the third converter employs line commutated converters, the second converter employs a voltage source converter, and active power can only be transferred unidirectionally from the first DC grid to the second DC grid of a seventh exemplary embodiment of the invention.

FIG. 8 illustrates a seventh embodiment of the present invention, in which the first converter 1 and the third converter 3 employs line commutated converters instead of voltage source converters. In this embodiment, the power can only be transferred to the second DC grid 9 from the first DC grid 8, which is suitable for unidirectional power transfer between two DC grids. Since rated DC voltage of the line commutated converter is significantly higher than that of the voltage source converter, and cost of the line commutated converter is much lower than that of the voltage source converter with the same power and rated DC voltage, the embodiment of FIG. 8 is able to achieve unidirectional power transfer between the first DC grid 8 and the second DC grid 9 at relatively lower cost. The line commutated converter is a thyristors based converter, details of which are well-known in the art, and will not be described hereinafter.

Figure 9:
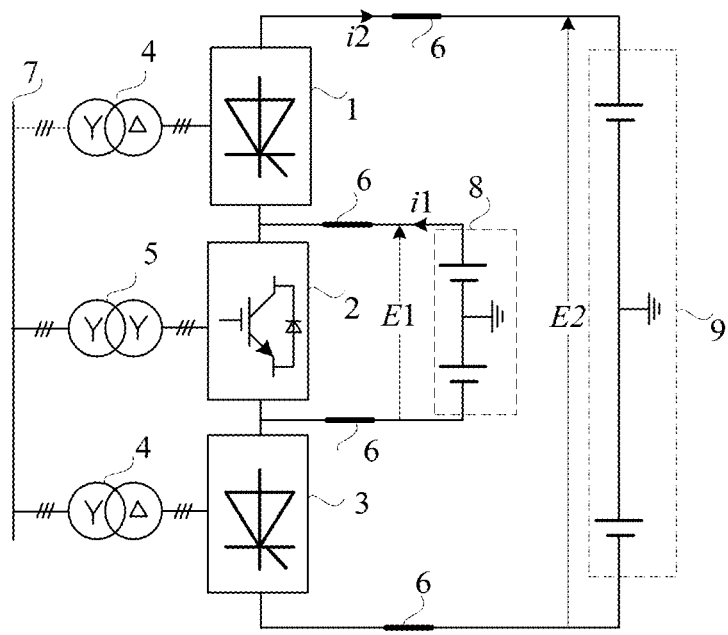
FIG. 9 illustrates a scenario where the first converter and the third converter employs the line commutated converters, the second converter employs the voltage source converter, and the active power can only be transferred unidirectionally from the second DC grid to the first DC grid of an eighth exemplary embodiment of the invention.

FIG. 9 illustrates an eighth embodiment of the present invention, which is similar to FIG. 8 except that connection of the first converter 1 and the third converter 3 is reverse to that of the first converter 1 and the third converter 3 in FIG. 8, and power in the embodiment of FIG. 9 can only be transferred unidirectionally from the second DC grid 9 to the first DC grid 8.

Figure 10:
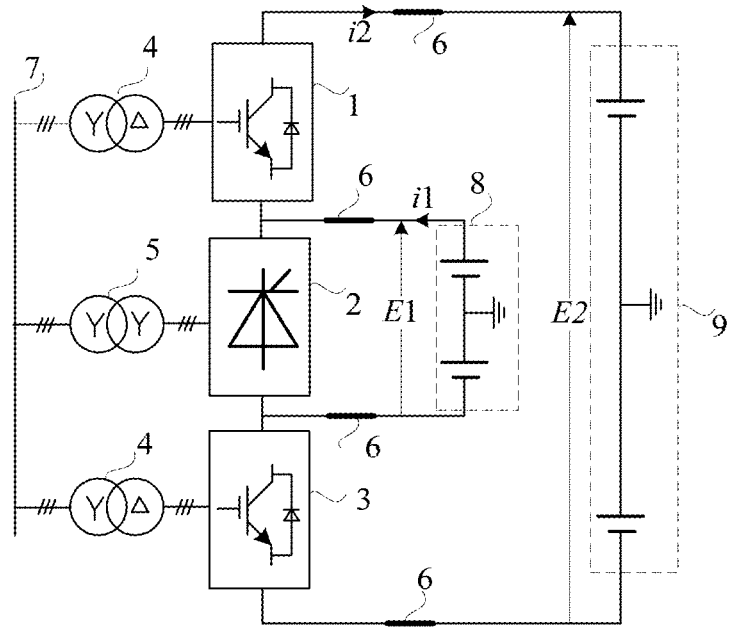
FIG. 10 illustrates a scenario where the first converter and the third converter employ voltage source converters, the second converter employs the line commutated converter, and the power can only be transferred unidirectionally from the first DC grid to the second DC grid of a ninth exemplary embodiment of the invention.

FIG. 10 illustrates a ninth embodiment of the present invention, which is similar to FIG. 8 except that the first converter 1 and the third converter 3 employ voltage source converters, while the second converter 2 employs a line commutated converter.

Figure 11:
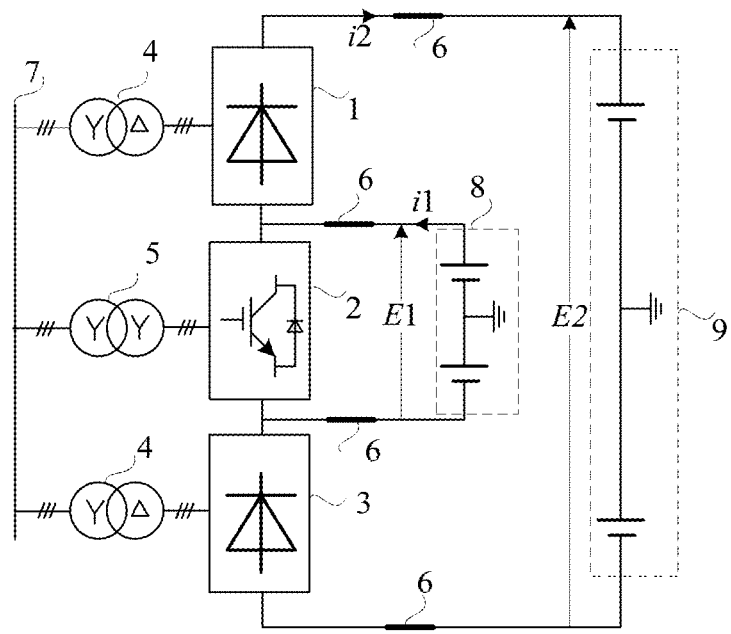
FIG. 11 shows a scenario where the first converter and the third converter employ un-controlled rectifying bridges, and the second converter employs a voltage source converter of a tenth exemplary embodiment of the invention.

FIG. 11 illustrates a tenth embodiment of the present invention, in which the second converter 2 employs a voltage source converter, the first line commutated converter 1 and the third line commutated converter 3 employ un-controlled rectifying bridges, and the un-controlled rectifying bridges are well-known in the art and will not be described hereinafter. This embodiment is able to significantly reduce cost of the first converter 1 and the third converter 3, and improve reliability of the first converter 1 and the third converter 3. However, one of its drawbacks is relative poor control performance.

Figure 12:
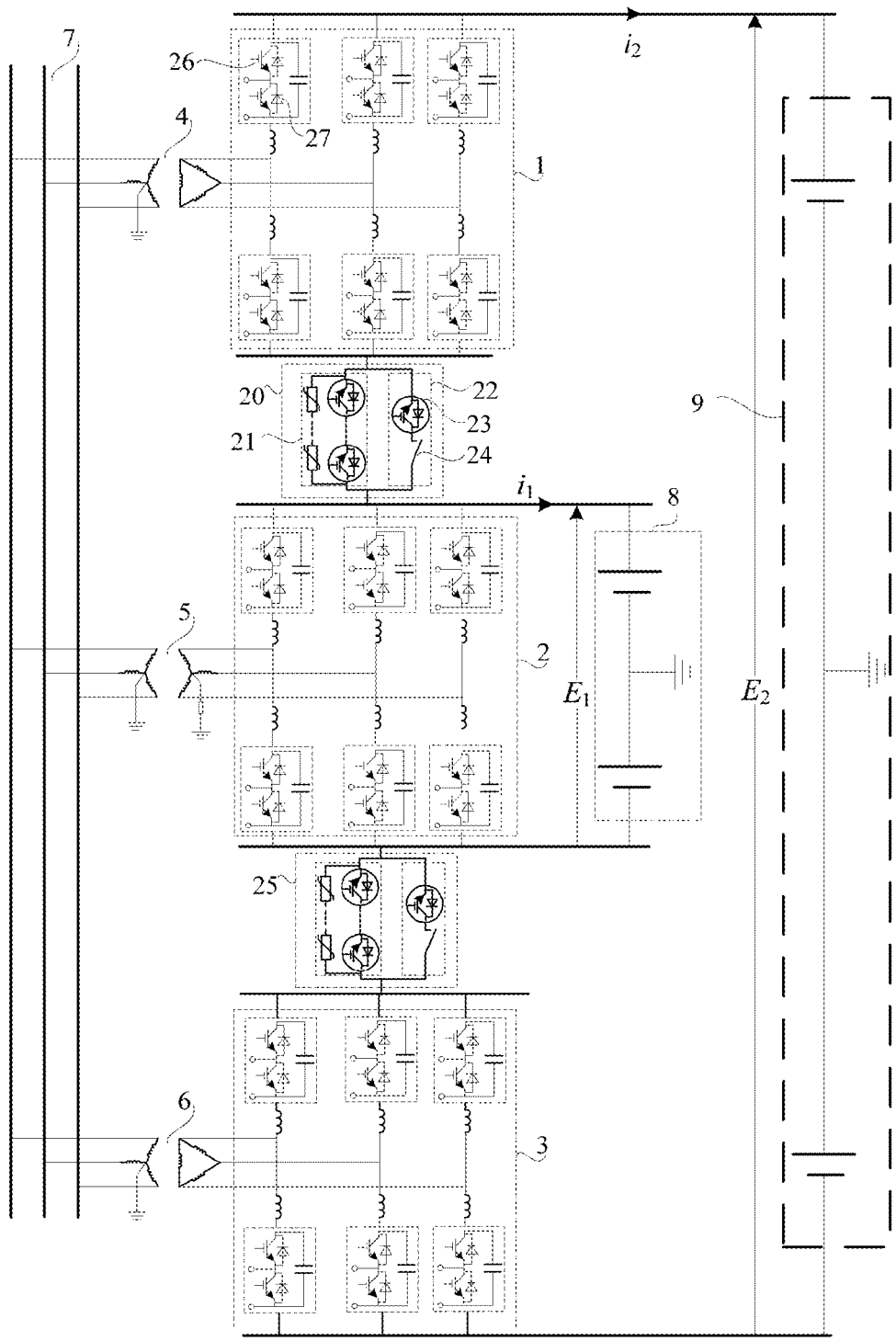
FIG. 12 shows a scenario where a first DC circuit breaker is serially connected between a negative terminal of the first converter and a positive terminal of the second converter, and a second DC circuit breaker is serially connected between a negative terminal of the second converter and a positive terminal of the third converter of an eleventh exemplary embodiment of the invention.

FIG. 12 illustrates an eleventh embodiment of the present invention, in which a first DC circuit breaker 20 is serially connected between the negative terminal of the first converter 1 and the positive terminal of the second converter 2, and a second DC circuit breaker 25 is serially connected between the negative terminal of the second converter 2 and the positive terminal of the third converter 3. The first converter 1, the second converter 2 and the third converter 3 employ half-bridge modular multilevel converters. The half-bridge modular multilevel converter is a well-known voltage source converter in the art, and will not be described hereinafter. More details of the DC circuit breaker can be found in JÜRGEN HÄFNER, BJÖRN JACOBSON "Proactive Hybrid HVDC Breakers—A key innovation for reliable HVDC grids", CIGRE 2011 Bologna Symp., Bologna, Italy, paper 264, September 2011. The present invention discloses an optimal installation location of the DC circuit breaker, i.e., the first DC circuit breaker 20 is installed between the first converter 1 and the second converter 2, and the second DC circuit breaker 25 is installed between the second converter 2 and the third converter 3. When DC fault occurs on the second DC grid 9, by blocking trigger pulses of the fully controllable power electronic devices 26 of the first converter 1, the second converter 2 and the third converter 3, it is possible to cut off paths of DC fault current provided to fault points of the second DC grid 9 by the first converter 1, the second converter 2 and the third converter 3 via the fully controllable power electronic devices 26 respectively, simultaneously, by opening the first DC circuit breaker 20 and the second DC circuit breaker 25, it is possible to cut off paths of DC fault current provided to the fault points of the second DC grid via diodes 27 of the first converter 1 and the third converter 3.

When DC fault occurs on the first DC grid 8, by blocking trigger pulses of fully controllable power electronics devices 26 in the first converter 1, the second converter 2 and the third converter 3, it is possible to cut off paths of DC fault current provided to fault points of the first DC grid 8 by the first converter 1, the second converter 2 and the third converter 3 via the fully controllable power electronics devices 26 respectively, and simultaneously, by opening the first DC circuit breaker 20 and the second DC circuit breaker 25 so that voltage of the second DC grid 9 is applied to a series connection circuit of the first converter 1, the first DC circuit breaker 20, the second DC circuit breaker 25 and the third converter 3 so as to protect the first converter 1 and the third converter 3 from being destroyed by over voltage as the first converter 1 and the third converter 3 solely endure DC voltage of the second DC grid 9.

Based on the above analysis, it is to be appreciated that if the first DC circuit breaker 20 and the second DC circuit breaker 25 are installed at the position shown in FIG. 12, the stereoscopic DC-DC converter is not to be damaged by over voltage or over current even if the DC fault occurs on the first DC grid 8 or the second DC grid 9.

The rated DC current of each of the first DC circuit breaker 20 and the second DC circuit breaker 25 in FIG. 12 is i1-i2=(P/E1-P/E2), therefore, the rated DC current of each of the first DC circuit breaker 20 and the second DC circuit breaker 25 is designed to be (P/E1-P/E2).

When the DC fault occurs on the first DC grid 8, the voltage that is able to be withstand by the first converter 1 and the third converter 3 after their fully controllable power electronic devices are blocked is (E2-E1)/2, while the rated DC voltage of the second DC grid 9 is E2. To ensure the first converter 1 and the third converter 3 are not to be damaged by over voltage as the DC fault occurs on the second DC grid 9, preferred a rated DC voltage for each of the first DC circuit breaker 20 and the second DC circuit breaker 25 is E1/2.

Since it is required that the first DC circuit breaker 20 and the second DC circuit breaker 25 are capable of isolating DC fault current as the DC fault occurs on the second DC grid, preferably, the first DC circuit breaker 20 and the second DC circuit breaker 25 employ unidirectional circuit breakers as shown in FIG. 12 so as to reduce cost thereof. The unidirectional circuit breaker only needs to cut off the fault current provided to the second DC grid 9 by the first DC grid 8 when DC fault occurs on the second DC grid 9. When the DC fault occurs on the first DC grid 8, by blocking the trigger pulses of the fully controllable power electronic devices 26 of the first converter 1 and the third converter 3, there will be no fault current flowing through the first DC circuit breaker 20 and the second DC circuit breaker 25, and therefore, the first DC circuit breaker 20 and the second DC circuit breaker 25 does not need to have the capability of isolating the fault current flowing from the second DC grid 9 to the first DC grid 8.

If one or two of the first converter 1, the second converter 2 and the third converter 3 in FIG. 12 employ line commutated converters or un-controlled rectifying bridges, the first DC circuit breaker 20 and the second DC circuit breaker 25 positioned in FIG. 12 are still able to protect the first converter 1 and the third converter 3 from being damaged by over current as the DC fault occurs on the second DC grid 9, and to provide over-voltage protection for the second converter 2 as the DC fault occurs on the first DC grid 8.

Figure 13:
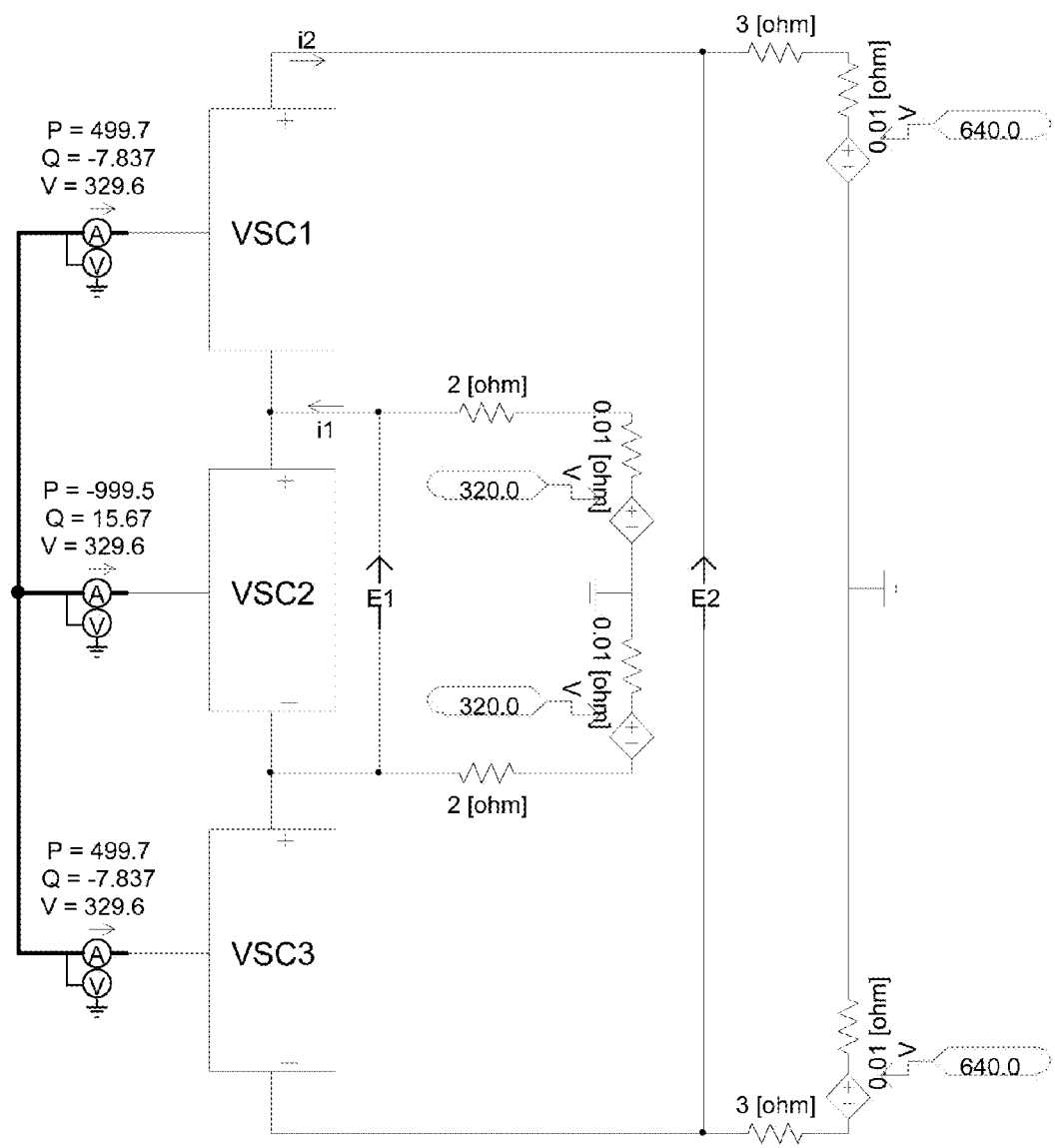
FIG. 13 illustrates a simulation example for verifying technical feasibility of the invention that is built on well-recognized software PSCAD/EMTDC.
Figure 14:
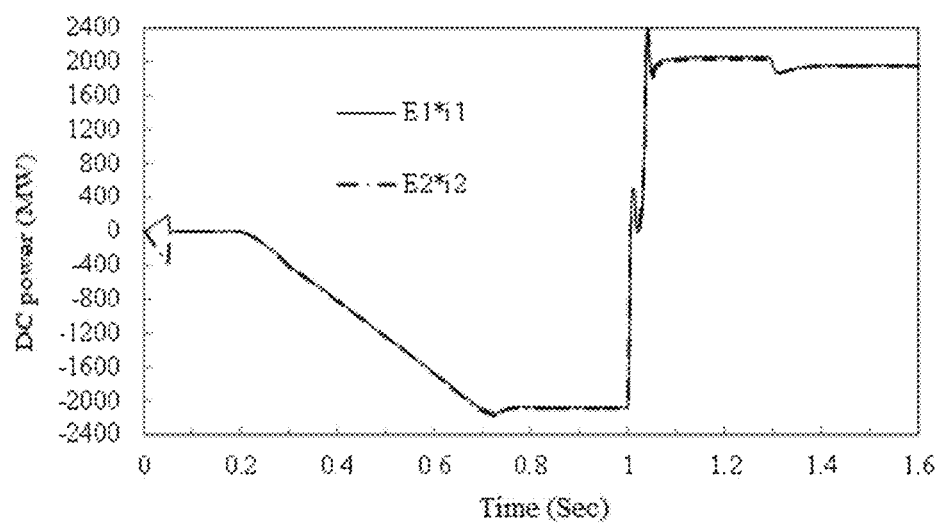
FIG. 14 is a curve illustrating DC power obtained by simulation.

To verify feasibility of the present invention, as shown in FIG. 13, a simulation example for verifying technical feasibility of the invention is built on well-recognized software PSCAD/EMTDC, in which the rated DC voltage of the first DC grid 8 is ±320 kV, the rated DC voltage of the second DC grid 9 is ±640 kV, the rated transferred power between the two DC grids is 2000 MW. FIG. 14 illustrates corresponding simulation results. From 0.2 s to 0.7 s, power transferred from the second DC grid 9 to the first DC grid 8 is increased from 0 MW to 2000 MW, at 1.0 s, a power transfer direction is reversed, the first DC grid 8 transfers 2000 MW DC power to the second DC grid 9. FIG. 14 illustrates that the present invention is able to enable power transfer between two DC grids. FIG. 13 also illustrates an absolute value of active power transferred by the the first converter 1 (VSC1), the second converter 2 (VSC2) and the third converter 3 (VSC3) in a steady state are respectively 499.7 MW, 999.5 MW and 499.7 MW. Therefore, overall power of the three converters is 2000 MW, which equals the transferred power. For the conventional DC-DC converter; a converter with overall power of 4000 MW is required.

Preferably, the first converter 1, the second converter 2 and the third converter 3 of the present invention employ voltage source converters so as to achieve bidirectional power flow, the voltage source converter is well-known in the art, and can employ 2-level topology, 3-level topology, modular multilevel topology and so on.

Compared with conventional DC-DC converters, the DC-DC converter for interconnecting two DC grids with different rated DC voltages has the following advantages:

(1) The total used power converters is lower than 2 times the transferred power, while in the conventional DC-DC converter, the total required power converters is always 2 times the transferred power, therefore, the present invention is able to significantly reduce the required converter rating compared with conventional technology.

(2) According to the information disclosed by the CIGRE, capital investment per 1 GW of converter is 110 million euro, taking interconnecting the typical ±320 kV DC grids and the ±640 kV DC grids as an example, with interchanging each 1 GW DC power, the stereoscopic DC-DC converter is able to reduce 1 GW power converter compared with traditional DC-DC converter, while in China and over the word, the interchanging power could reach up to hundreds of GW, economic benefits of the present invention compared with conventional DC-DC converter is obvious.

(3) Since the overall power of all converters in the present invention is lower than that of the traditional DC-DC converter, the present invention is able to reduce power of AC transformers, phase reactors and so on that are used.

While preferred embodiments of the invention have been described above, the invention is not limited to disclosure in the embodiments and the accompanying drawings. Any changes or modifications without departing from the spirit of the invention fall within the scope of the invention.

The invention claimed is:

1. A stereoscopic DC-DC converter for power transfer between a first DC grid (8) and a second DC grid (9), comprising a first converter (1), a second converter (2), and a third converter (3), wherein:
   a positive terminal of said first converter (1) is directly connected to a positive terminal of said second DC grid (9);
   a negative terminal of said first converter (1) is connected to a positive terminal of said second converter (2);
   a negative terminal of said second converter (2) is connected to a positive terminal of said third converter (3);
   a negative terminal of said third converter (3) is directly connected to a negative terminal of said second DC grid (9);
   said positive terminal of said second converter (2) is connected, via a DC transmission line, to a positive terminal of said first DC grid (8); and
   said negative terminal of said second converter (2) is directly connected, via a DC transmission line, to a negative terminal of the first DC grid (8), wherein at least part of the power transferred between the first DC grid and the second DC grid is transferred via a direct electrical connection between the first DC grid and the second DC grid without DC-AC-DC conversion.

2. The stereoscopic DC-DC converter of claim 1, wherein each of the first converter (1), the second converter (2), and the third converter (3) comprises an AC terminal, and wherein:
   the AC terminals of said first converter (1) and of said third converter (3) are connected to an AC grid via first and third transformers, respectively, and the AC terminal of said second converter (2) is connected to said AC grid via a second transformer or a second phase reactor; or
   said AC terminals of said first converter (1) and of said third converter (3) are connected to said AC grid via first and third phase reactors, respectively, and said AC terminal of said second converter (2) is connected to said AC grid via a second transformer.

3. The stereoscopic DC-DC converter of claim 2, wherein the AC terminals of said first converter (1), said second converter (2), and said third converter (3) are connected to a common AC bus (7) or to different AC grids, respectively.

4. The stereoscopic DC-DC converter of claim 2, wherein the AC terminals of said first converter (1) and of said third converter (3) are connected to an AC grid via first and third transformers, respectively, and the AC terminal of said second converter (2) is connected to said AC grid via the second transformer or the second phase reactor, and wherein AC terminals of transformers (4, 5) of said first converter (1) and of said third converter (3) in the vicinity of a DC side employ delta connection to eliminate unbalanced neutral points of said first converter (1) and said third converter (3), and AC terminals of transformers (4, 5) of said second converter (2) in the vicinity of a DC side and terminals of said first converter (1) and said third converter (3) in the vicinity of an AC side employ star connection or delta connection.

5. The stereoscopic DC-DC converter of claim 2, wherein said AC terminals of said first converter (1) and of said third converter (3) are connected to said AC grid via first and third phase reactors, respectively, and the AC terminal of said second converter (2) is connected to said AC grid via the second transformer, and wherein each phase of phase reactor branches (13, 16) of said first converter (1) and said third converter (3) employs delta connection to eliminate unbalanced neutral points of said first converter (1) and said third converter (3).

6. The stereoscopic DC-DC converter of claim 1, wherein said first converter (1), said second converter (2), and said third converter (3) employ voltage source converters, line commutated converters, or un-controlled rectifying bridges.

7. The stereoscopic DC-DC converter of claim 1, wherein said first converter (1) and said third converter (3) employ thyristor-based line commutated converters to enable unidirectional power flow between said first and second DC grids (8, 9), so as to achieve interconnection between two DC grids with unidirectional power flow.

8. The stereoscopic DC-DC converter of claim 1, wherein a first DC circuit breaker (20) is serially connected between said negative terminal of said first converter (1) and said positive terminal of said second converter (2), and a second DC circuit breaker (25) is serially connected between said negative terminal of said second converter (2) and said positive terminal of said third converter (3), so that said stereoscopic DC-DC converter is not destroyed by over voltage or over-current during DC fault at said first DC grid (8) and/or said second DC grid (9).

9. The stereoscopic DC-DC converter of claim 8, wherein protection of said stereoscopic DC-DC converter during DC fault at said second DC grid (9) is facilitated by blocking trigger pulses of fully controllable power electronics devices (26) or thyristors in said first converter (1), said second converter (2), and said third converter (3) to cut off paths of DC fault current provided to fault points of said second DC grid (9) by said first converter (1), said second converter (2), and said third converter (3) via said fully controllable power electronics devices (26) or said thyristors, respectively, and by simultaneously opening said first DC circuit breaker (20) and said second DC circuit breaker (25) to cut off paths of DC fault current provided to said fault points of said second DC grid (9) by said first DC grid (8) via diodes of said first converter (1) and said third converter (3).

10. The stereoscopic DC-DC converter of claim 8, wherein by blocking trigger pulses of fully controllable power electronics devices (26) or thyristors in said first converter (1), said second converter (2), and said third converter (3) to cut off paths of DC fault current provided to fault points of said first DC grid (8) by said first converter (1), said second converter (2) and said third converter (3) via said fully controllable power electronics devices (26) or said thyristors, respectively, and by simultaneously opening said first DC circuit breaker (20) and said second DC circuit breaker (25) so that voltage of said second DC grid (9) is applied to a series connection circuit of said first converter (1), said first DC circuit breaker (20), said second DC circuit breaker (25), and said third converter (3), said first converter (1) and said third converter (3) are protected from being destroyed by over voltage as said first converter (1) and said third converter (3) solely endure DC voltage of said second DC grid (9), and to facilitate protection of said stereoscopic DC-DC converter during DC fault at said first DC grid (8).

11. The stereoscopic DC-DC converter of claim 8, wherein:
rated DC voltage of said first DC circuit breaker (20) and said second DC circuit breaker (25) is half that of said second converter (2), and rated current of said first DC circuit breaker (20) and said second DC circuit breaker (25) is P|E1-P/E2, where P is rated transferred power between said first DC grid (8) and said second DC grid (9), E1 is rated DC voltage of said first DC grid (8), and E2 is rated DC voltage of said second DC grid (9).

12. The stereoscopic DC-DC converter of claim 1, wherein said first converter (1) and said third converter (3) operate to control active power thereof, and said second converter (2) operates to control AC voltage of said AC grid connected thereto whereby facilitating stable operation of said stereoscopic DC-DC converter.

13. The stereoscopic DC-DC converter of claim 1, wherein said first converter (1) and said third converter (3) operate to control AC voltage of said AC grid connected thereto, and said second converter (2) operates to control said transferred power between said first DC grid (8) and said second DC grid (9), thereby facilitating stable operation of said stereoscopic DC-DC converter.

14. The stereoscopic DC-DC converter of claim 1, wherein said first DC grid (8) and/or said second DC grid (9) is formed by interconnecting one or more AC systems at said DC side after AC/DC conversion.

15. The stereoscopic DC-DC converter of claim 1, wherein said first DC grid (8) and/or said second DC grid (9) is formed by interconnecting one or more AC grids to a DC system outputting DC power at said DC side after AC/DC conversion.

16. The stereoscopic DC-DC converter of claim 1, wherein said first DC grid (8) or said second DC grid (9) employs symmetrical bipolar topology, symmetrical monopole topology, asymmetrical monopole topology or asymmetrical bipolar topology.

17. The stereoscopic DC-DC converter of claim 1, wherein rated DC voltage for said first converter (1) and said third converter (3) is half of a difference between said rated DC voltages of said second DC grid (9) and said first DC grid (8), and said rated DC voltage of said second converter (2) is equal to that of said first DC grid (8).

18. The stereoscopic DC-DC converter of claim 1, wherein rated power of said first converter (1) and said third converter (3) is 0.5*P*(1-E1/E2), and rated power of said second converter (2) is P*(1-E1/E2), where P is said rated transferred power between said first DC grid (8) and said second DC grid (9), E1 is said rated DC voltage of said first DC grid (8), and E2 is said rated DC voltage of said second DC grid (9).

* * * * *